Patented Feb. 20, 1940

2,191,114

UNITED STATES PATENT OFFICE 2,191,114

CONDENSATION PRODUCT OF THE PERYLENE SERIES

Heinrich Neresheimer and Anton Vilsmeier, Ludwigshafen-on-the-Rhine, Germany, assignors to General Aniline & Film Corporation, a corporation of Delaware No Drawing. Original application July 7, 1937, Serial No. 152,380. Divided and this application February 12, 1938, Serial No. 190,320. In Germany July 7, 1936

5 Claims. (Cl. 87—9)

The present invention relates to compositions of matter comprising a hydrocarbon oil and a condensation product of the perylene series. The application has been divided out from our application Ser. No. 152,380 filed July 7, 1937, Patent No. 2,158,296, May 16, 1939.

We have found that new and valuable condensation products of the perylene series are obtained by heating hydroxy or mercapto compounds of the perylene series with unsaturated hydrocarbons of high molecular weight or high molecular alcohols, esters, mercaptans, amines, ethers or thioethers in the presence of acid condensing agents. The term "high molecular" means that the said compounds shall contain at least six carbon atoms. The expression "perylene series" is intended to include perylenes, azaperylenes and the corresponding ketonic bodies, such as dibenzanthrone and isodibenzanthrone.

The perylene derivatives serving as initial materials may be prepared by methods which are known per se. Thus for example the hydroxy compounds may be obtained by the hydrolysis of sulphonic acids or halogen compounds or by the reduction of ketones the mercapto compounds may be obtained by the reduction of sulphonic acid halides. Instead of starting from the hydroxy or mercapto compounds themselves, the initial materials may also be compounds which are converted into the said substances under the reaction conditions, as for example ketones of the perylene series such as are present in the vat dyestuffs of the dibenzanthrone and isodibenzanthrone series. Ethers or esters of leuco compounds of the said vat dyestuffs may also be used as initial materials.

As starting materials also compounds may be used which yield derivatives of the perylene series under the reaction conditions; for example, 2.2'-dibenzanthronyl may be employed as a starting compound.

Among unsaturated hydrocarbons of high molecular weight, there may be mentioned for the present reaction those of the aliphatic series containing at least 6 carbon atoms, and also those of the aliphatic-aromatic and cycloaliphatic series. The value of the final products is greater and their capacity for being used more extensive the greater the number of carbon atoms.

The reaction is carried out in the presence of acid condensing agents among which the anhydrous halides of zinc are especially suitable. Boron fluoride and substances derived therefrom, anhydrous aluminum, iron or tin halides may, however, also be used. In addition to the said condensing agents it is frequently advantageous to use also halogen hydracids or basic substances (tertiary amines or alkali metal carbonates). In many cases the reaction may be promoted by the addition of metals, such as zinc dust. Generally speaking a diluent is used, examples of such being paraffin hydrocarbons or halogen-benzenes. In many cases an excess of one of the participants in the reaction may be used as a diluent. Thus for example by heating leuco dibenzanthrone with an excess of dodecylene in the presence of zinc chloride while leading in hydrogen chloride gas, a deep red oil is obtained in an excellent yield which dissolves extremely readily in organic liquids giving a reddish yellow coloration and a yellow fluorescence tinged with olive. Dodecyl alcohol or dodecyl bromide may also be used instead of dodecylene. Instead of zinc bromide, zinc dust may also be used if the reaction is carried out by means of dodecyl bromide because the zinc bromide acting as condensing agent is thereby formed.

Instead of dibenzanthrone or its leuco compound, other hydroxy or keto, or also mercapto compounds of the perylene series may be used. These compounds may also be reacted with other unsaturated hydrocarbons of high molecular weight or the high molecular compounds mentioned above. Butylene, di-isobutylene, dodecyl mercaptan, dodecylamine, dodecyl vinyl sulphide, octodecyl alcohol and alcohols of the cyclopentane, cyclohexane, hydronaphthalene, hydroanthracene and terpene series may be given as examples.

In this manner there are generally speaking obtained vividly colored compounds which are usually very readily soluble in organic liquids. Their solutions have in part a vivid fluorescence so that they may be used with advantage for the coloring and/or rendering fluorescent of artificial resins of various kinds, of hydrocarbons, paraffin waxes, oils, waxes, fats, mineral oils, rubber and other natural and synthetic plastic masses as well as lacquers. They are also suitable as additions to nitrocellulose lacquers. Finally they may also be used for the preparation of other dyestuffs.

The following examples will further illustrate how the said invention may be carried out in practice but the invention is not restricted to these examples. The parts are by weight.

*Example 1*

Dry hydrogen chloride gas is led for some time at 220° C. into a mixture of 50 parts of dodecyl alcohol and 10 parts of dibenzanthrone; 10 parts of anhydrous zinc chloride are then added and the mixture stirred at from about 215° to 220° C. while further leading in hydrogen chloride until unchanged dibenzanthrone can no longer be detected. The mixture is then allowed to cool and it is diluted with 200 parts of benzene. Undissolved constituents are filtered off by suction and the residue washed with benzene. The benzene solution is evaporated and the oily residue heated under reduced pressure. In this way a colorless substance similar to paraffin oil passes over while an excellent yield of a deep red oil which is readily mobile when hot remains behind; the said oil is very readily soluble for example in paraffin oil; the solution is reddish yellow and has a very powerful olive-tinged yellow fluorescence.

If 50 parts of dodecylene be used instead of dodecyl alcohol and the reaction be carried out at from about 195° to 200° C., the same substance is obtained. If the residue which is at first insoluble in benzene be extracted with benzene again after washing with methanol and water, there may be obtained by evaporation a deep red oil which dissolves in paraffin oil giving a much redder coloration and a more bluish fluorescence.

If 50 parts of dihydroabietinol be used instead of dodecyl alcohol, a final product having very similar properties is obtained.

If one part of the condensation product described in the first paragraph is dissolved in 10,000 parts of paraffin oil, a solution having a yellow-red coloration and an olive-tinged yellow fluorescence is obtained having a good stability against heating and the light.

Example 2

A slow stream of hydrogen chloride is led at from 200° to 220° C. into a mixture of 50 parts of dodecyl alcohol, 10 parts of dibenzanthrone and 10 parts of zinc dust while stirring until dibenzanthrone can no longer be detected. The mixture is worked up in the manner described in Example 1. An excellent yield of the final product described in Example 1 is obtained.

The procedure may also be that zinc dust is gradually introduced into a mixture of dibenzanthrone, dodecyl alcohol and a little anhydrous zinc chloride while leading in hydrogen chloride.

When the reaction is carried out at lower temperatures or is interrupted earlier, an oil may be obtained the solution of which in paraffin oil has a less reddish coloration but a more bluish fluorescence than the substance described in the first paragraph of this example.

By using other alcohols of high molecular weight of the aforesaid kind instead of dodecyl alcohol, similar final products are obtained.

Example 3

A mixture of 100 parts of dodecyl bromide, 10 parts of dibenzanthrone, 10 parts of zinc dust and 10 parts of anhydrous sodium carbonate is heated for boiling for a short time, allowed to cool to about 150° C. and the mass extracted with benzene. The benzene solution is evaporated and the residual deep red colored oil is washed with methanol. It agrees in its properties with the substance described in Example 2.

Similar substances are obtained by using dodecyl chloride or halides of other alcohols of high molecular weight of the aforesaid kind instead of dodecyl bromide.

If Bz2.Bz2'-dimethoxydibenzanthrone be used instead of dibenzanthrone, a deep red colored oil is also obtained which dissolves in hydrocarbons very readily to give a violet-red coloration and a brownish olive fluorescence.

A similar product is obtained by employing Bz2-Bz2'-dihydroxydibenzanthrone instead of Bz2.Bz2'-dimethoxydibenzanthrone. If in the reaction described in the third paragraph Bz2.-Bz2'-dimethyl-di-mercaptodibenzanthrone is employed instead of Bz2.Bz2'-dimethoxydibenzanthrone, a similar reaction product is obtained.

Example 4

A mixture of 50 parts of dedecyl bromide, 10 parts of dibenzanthrone, 10 parts of zinc dust, 15 parts of anhydrous sodium carbonate and 20 parts dimethylaniline is heated at from about 220° to 230° C. for about an hour while stirring and then worked up in the manner described in Example 1. The red oil thus obtained dissolves in paraffin oil very readily to give a pure yellow coloration and a brownish olive fluorescence of strong covering power.

Example 5

10 parts of dibenzanthrone are vatted in the usual way with dilute caustic soda solution and hydrosulphite at from 50° to 55° C. and the free leuco acid is precipitated from the vat by means of bisulphite solution, filtered off by suction, washed with dilute acetic acid, pressed out well and suspended in 150 parts of trichlorbenzene. The said suspension is heated to boiling until all adherent water has been evaporated, 100 parts of dodecyl bromide and 10 parts of anhydrous zinc chloride are then added and the mixture heated until all the leuco acid has been reacted. The whole is then allowed to cool to 150° C., filtered by suction and the residue washed with 150 parts of trichlorbenzene. From the deep red colored filtrate there is obtained by the addition of methanol an excellent yield of a deep red colored oil which agrees to a great extent in its properties with the substance prepared according to Example 1.

Example 6

A mixture of 50 parts of dodecyl bromide, 5 parts of isodibenzanthrone, 5 parts of zinc dust and 5 parts of anhydrous sodium carbonate is heated to boiling until initial material is no longer present. The whole is then filtered by suction at 150° C. and the residue washed with benzene. From the filtrate there is obtained by the addition of methanol a red oil which is washed with methanol and dried. It dissolves for example in paraffin oil giving a red-violet coloration and a strong, olive-tinged brown-yellow fluorescence.

A final product having similar properties is obtained from 6.6'-dichlorisodibenzanthrone.

Example 7

A moderate stream of hydrogen chloride is led into 50 parts of dodecyl alcohol at about 220° C. for a short time, 5 parts of the dodecyl ether of leuco dibenzanthrone and 5 parts of anhydrous zinc chloride then being introduced at about 210° C. The mixture is heated at from about 200° to 205° C. while stirring and continually leading in hydrogen chloride until a sample withdrawn has become very readily soluble in benzene and fluoresces a powerful olive-tinged yellow color. The mixture is then allowed to cool somewhat, boiled with 200 parts of benzene, filtered by suction, the benzene evaporated off and the residual oil heated under reduced pressure. A red oil remains behind which is considerably more readily soluble for example in paraffin oil than the initial material with which it approximately agrees as regards the coloration and fluorescence of its solutions.

A final product having similar properties is obtained by starting from the methyl ether of leuco dibenzanthrone instead of the dodecyl ether.

*Example 8*

Dry hydrogen chloride is led for some time into 50 parts of dodecyl alcohol at 220° C. 3 parts of the benzoyl ester of leuco dibenzanthrone (prepared by treating dibenzanthrone with zinc dust in the presence of benzoyl chloride in pyridine) and from 10 to 15 parts of anhydrous zinc chloride are then added and the mixture is heated at from about 180° to 200° C. until benzoyl ester is no longer detectable. The whole is then allowed to cool, diluted with benzene, filtered by suction and the residue washed with benzene. The solution is worked up in the manner described in Example 1. A substance is thus obtained which agrees almost completely in its properties with the compound described in Example 1.

*Example 9*

A mixture of 25 parts of dodecyl vinyl sulphide, 5 parts of dibenzanthrone and 5 parts of anhydrous zinc chloride is heated at about 200° C. until dibenzanthrone can no longer be detected in a sample withdrawn. The whole is then allowed to cool, diluted with benzene, filtered by suction and methanol added to the filtrate. A deep yellow-red colored oil thus separates which dissolves very readily in paraffin oil giving a yellow coloration and a yellow-olive fluorescence.

*Example 10*

A mixture of 25 parts of dodecyl mercaptan, 5 parts of dibenzanthrone, 5 parts of anhydrous zinc chloride and 2 parts of zinc dust is heated at about 215° C. until dibenzanthrone can no longer be detected in a sample withdrawn. The whole is then worked up in the manner described in Example 9. A yellow oil is thus obtained which rapidly solidifies into a yellow-red solid mass. It dissolves in paraffin oil giving a yellow coloration and a yellow-olive fluorescence.

If the reaction described in the first paragraph is carried out while leading dry hydrogen chloride through the mixture, a deep red oil is obtained which has practically the same properties as the oil obtainable according to Example 1.

*Example 11*

A mixture of 30 parts of dodecyl bromide, 3 parts of perylene-3.10-quinone and 3 parts of anhydrous zinc chloride is heated at from 200° to 220° C. while stirring until a sample withdrawn dissolves very readily in benzene giving a powderful yellow coloration and a strong blue-green fluorescence. The mixture is then worked up in the manner described in Example 9. A deep brown-red oil is thus obtained which dissolves very readily in hydrocarbons giving a yellow coloration and a bluish olive fluorescence.

If 3 parts of dihydroxyperylene-3.10-quinone be used instead of perylene-3.10-quinone, a very similar final product is obtained.

By dissolving 1 part of the product described in the first paragraph in 10000 parts of benzene or another hydrocarbon a yellow solution having a bluish olive fluorescence is obtained which is stable against light.

*Example 12*

A moderate stream of hydrogen chloride gas is led for half an hour into a suspension, heated to 220° C., of 10 parts of perylene tetracarboxylic acid di-imide in 50 parts of dodecyl alcohol. 20 parts of anhydrous zinc chloride and 3 parts of zinc dust are then gradually added and the mixture is heated to from 200° to 210° C. while continually leading through hydrogen chloride until initial material is no longer present. The whole is then cooled and worked up in the manner described in Example 9. A yellow-brown oil is thus obtained which dissolves in paraffin oil giving a yellow-brown coloration and an olive fluorescence.

*Example 13*

A mixture of 5 parts of Bz3.Bz3'-diazadibenzanthrone, 50 parts of dodecylbromide, 5 parts of zinc dust and 5 parts of sodium carbonate is stirred at 215° C. until a sample dissolves in benzene giving a yellow coloration and a powerful yellow-olive fluorescence. The mass is then allowed to cool, diluted with benzene and undissolved ingredients are filtered off by suction and washed with benzene. The filtrates are freed from benzene by distillation and the oily residue is distilled under reduced pressure, whereby a colorless paraffin-like oil distils and a brown-red oil remains behind which dissolves readily, for example, in paraffin oil giving a yellow coloration and a powerful yellow-olive fluorescence. It is also soluble in other hydrocarbons or in lubricating oils giving a similar coloration and a similar fluorescence.

*Example 14*

A mixture of 20 parts of didodecylether (obtained by reacting dodecylbromide with sodium dodecylate), 4 parts of dibenzanthrone and 4 parts of zinc dust is heated at from 180° to 220° C. while leading through gaseous hydrogen chloride until unchanged dibenzanthrone is no longer detectable. After cooling, the reaction mixture is worked up in the manner described in Example 1. The end product is very similar to that described in Example 1.

Instead of the didodecylether unsymmetrical ethers of the dodecyl alcohol may be used such as its methyl or ethyl ether.

*Example 15*

A mixture of 20 parts of didodecylsulphide (obtainable by heating dodecyl bromide with a solution of sodium sulphide in ethanol), 4 parts of dibenzanthrone and 4 parts of zinc dust is heated while stirring and while leading through gaseous hydrogen chloride at about 220° C. until dibenzanthrone is no longer detectable. After cooling the reaction mixture is diluted with benzene, freed from undissolved ingredients by filtering off and the filtrate is freed from benzene by distillation. The oily residue is then washed with methanol, whereby it solidifies giving a brown product which dissolves very readily in mineral oils, paraffin oil, lubricating oils and the like giving a yellow coloration and a powerful olive fluorescence.

*Example 16*

A mixture of 100 parts of dodecylamine, 10 parts of dibenzanthrone and 10 parts of zinc chloride is stirred at from 220° to 230° C. until unchanged dibenzanthrone is no longer detectable. The liquid reaction product is filtered off from a dark residue and the filtrate is diluted with methanol. In this manner a glittering violet product is obtained which dissolves in paraffin oil giving a red-violet coloration and an olive-brown fluorescence.

*Example 17*

A mixture of 100 parts of dodecyl bromide, 20 parts of 2.2'-dibenzanthronyl and 50 parts of anhydrous zinc chloride is heated for several hours while stirring at from 200° to 220° C. and then worked up in the manner described in Example 1. The reaction product is identical with that described in the first paragraph of Example 1.

What we claim is:

1. A composition of matter comprising a hydrocarbon oil and a high molecular from oily to solid condensation product of the perylene series containing in its molecule alkyl groups having at least 6 carbon atoms, the said condensation product being readily soluble in hydrocarbons and mineral oils giving from yellow to violet coloration and an olive-yellow to olive-bluish fluorescence and being from difficultly soluble to insoluble in cold sulphuric acid and not capable of being saponified by hot sulphuric acid yielding the initial material.

2. A composition of matter comprising a hydrocarbon oil and a condensation product of the perylene series derived from dibenzanthrone being a deep-red oil containing in its molecule dodecyl radicles, being soluble in hydrocarbons, the solution being reddish-yellow and having a very powerful olive-tinged yellow fluorescence.

3. A composition of matter comprising a hydrocarbon oil and a condensation product of the perylene series being derived from isodibenzanthrone containing in its molecule dodecyl radicles which condensation product is a red oil dissolving in paraffin oil giving a red-violet coloration and a strong olive-tinged brown-yellow fluorescence.

4. A composition of matter comprising a hydrocarbon oil and a condensation product of the perylene series derived from perylene-3.10-quinone containing in its molecule dodecyl radicles which product is a deep-brown red oil which is very readily soluble in hydrocarbons giving a yellow coloration and a bluish-olive fluorescence.

5. A hydrocarbon oil containing a small percentage of a high molecular from oily to solid condensation product of the perylene series containing in its molecule alkyl groups having at least 6 carbon atoms, the said condensation product being readily soluble in hydrocarbons and mineral oils giving from yellow to violet coloration and an olive-yellow to olive-bluish fluorescence and being from difficultly soluble to insoluble in cold sulphuric acid and not capable of being saponified by hot sulphuric acid yielding the initial material.

HEINRICH NERESHEIMER.
ANTON VILSMEIER.